US008000693B2

(12) United States Patent
Bhakta et al.

(10) Patent No.: US 8,000,693 B2
(45) Date of Patent: *Aug. 16, 2011

(54) METHOD, APPARATUS AND COMPUTER PROGRAM PRODUCT FOR CONTROLLING ACCESS BY A USER'S PORTABLE DEVICE TO A FACILITY DIRECTORY

(75) Inventors: Dharmesh N. Bhakta, Austin, TX (US); Marc-Arthur Pierre-Louis, Round Rock, TX (US); Radhakrishnan Sethuraman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1040 days.

This patent is subject to a terminal disclaimer.

(21) Appl. No.: 11/833,966

(22) Filed: Aug. 3, 2007

(65) Prior Publication Data
US 2007/0270138 A1 Nov. 22, 2007

Related U.S. Application Data

(63) Continuation of application No. 10/955,092, filed on Sep. 30, 2004, now Pat. No. 7,295,838.

(51) Int. Cl.
*H04M 3/00* (2006.01)
(52) U.S. Cl. ............... 455/418; 455/550.1; 455/436; 455/414.1; 455/550
(58) Field of Classification Search .............. 455/418, 455/421, 411, 436, 550–550.1
See application file for complete search history.

(56) References Cited

U.S. PATENT DOCUMENTS 6,484,027 B1 * 11/2002 Mauney et al. ............ 455/421

| | | |
|---|---|---|
| 2002/0178086 A1 | 11/2002 | Margeson |
| 2003/0068030 A1 | 4/2003 | Melius |
| 2003/0149641 A1 | 8/2003 | Kouketsu |
| 2003/0208386 A1 | 11/2003 | Brondup |
| 2004/0059610 A1 | 3/2004 | Winterton |
| 2004/0264410 A1 | 12/2004 | Sagi |
| 2005/0096013 A1 * | 5/2005 | Lehikoinen et al. ......... 455/411 |
| 2005/0190747 A1 | 9/2005 | Sindhwani |
| 2005/0282575 A1 | 12/2005 | Dorenbosch |

OTHER PUBLICATIONS

Rosen, Cheryl, "Travel Industry Cuts the Cord—Wireless Technology makes Work Easier for Employees and Boosts Customer Service", Information Week, Oct. 2, 2000.
Emmett, Arielle, "Tentative Steps for Convergence", Business Communications Review, 2, 30, Feb. 2000.
Kingsley, Lawrence, "Fall Comdex '97: The 'Websizing' of Computing", The Seybold Report on Internet Publishing, n5, v2, Jan. 1998.

* cited by examiner

*Primary Examiner* — Phuoc Doan
*Assistant Examiner* — Michael T Vu
(74) *Attorney, Agent, or Firm* — Justin Dillon; Anthony V S England (57) ABSTRACT

Controlling access to a facility includes sending a program and profile for facility services to a user's portable device. The services have telephones connected via a local area network ("LAN"), so a call originating on the LAN to such a telephone may be completed on the LAN without accessing a wide area telephone network ("WAN"). The program is executed on the user's portable device so that the device operates in a facility mode. In this mode, the device displays services from the profile, so that the user can select a service and easily place telephone calls to it solely over the LAN. Responsive to the user's service selection, in a normal operating sub-mode the user's portable device places a call via the WAN using a longer telephone number and in a local operating sub-mode the user's portable device places the call via the LAN using a shortcut number.

12 Claims, 6 Drawing Sheets

PROFILE
275

| DEST/SVC | TEL. NO. | LOCAL | |
|---|---|---|---|
|  |  |  |  |
| CLUB | 555-4567 | 7 |  |
| CONCIER. | 555-4568 | 8 |  |
| FRONT DESK | 555-4569 | 9 |  |
| RESTAUR. | 555-4566 | 6 |  |
|  |  |  |  |

310 → TEL. NO. column; 320 → LOCAL column; 330 → last column

METHOD, APPARATUS AND COMPUTER PROGRAM PRODUCT FOR CONTROLLING ACCESS BY A USER'S PORTABLE DEVICE TO A FACILITY DIRECTORY

CROSS REFERENCE TO RELATED APPLICATION

This is a continuation of, and hereby claims the benefit of the priority date of, application Ser. No. 10/955,092, filed Sep. 30, 2004 now U.S. Pat. No. 7,295,838.

BACKGROUND OF THE INVENTION

1. Technical Field

The present invention is related generally to wireless access to information, and more particularly, to wireless cell phone access to a directory of services, such as hotel guest services, using shortcut keys on the cell phone.

2. Description of Related Art

The proliferation of the Internet has had many effects. It has led to development of network, communication and data exchange standards. For example, Hypertext Markup Language ("HTML") and Extensible Markup Language ("XML") have been widely adopted for data formatting to facilitate information exchange. The HTML 4.01 specification is available at http://www.w3.org/TR/html401/ and is hereby incorporated herein by reference. The XML 1.0 recommendation is available at http://www.w3.org/TR/2004/REC-xml-20040204/ and is hereby incorporated herein by reference.

The proliferation of the Internet has also led to tremendous improvements in communications infrastructure, less expensive communication devices and convergence of voice and data networks. In this regard, Extensible Hypertext Markup Language ("XHTML") Basic has been widely adopted for wireless device Internet browsers. This XHTML Basic recommendation is available at http://www.w3.org/TR/2004/REC-xml-20040204/ and is hereby incorporated herein by reference. Widely adopted communications protocols for close-range wireless communication in the 2.4 gigahertz industrial, scientific and medical band include Bluetooth and IEEE 802.11. (Bluetooth is a trademark of Telefonaktibolaget.) Bluetooth Core Specification v1.2 is available at https://www.bluetooth.org/spec/ and is hereby incorporated herein by reference. Part 11:Wireless LAN Medium Access Control (MAC) and Physical Layer (PHY) Specifications ANSI/IEEE Std 802.11, 1999 Edition is available at http://standards.ieee.org/getieee802/download/802.11-1999.pdf and is hereby incorporated herein by reference.

All this has led to an ever increasing array of innovative network applications. According to one report, an integrated voice and data network facilitates premise-based telecommunications with "follow me" links, which enables quick connection to an enterprise telecommunications system for a mobile employee, and even enables downloading of an enterprise telephone profile to a computer/telephone when the employee is at a home office or a hotel room. "Tentative Steps For Convergence," Business Communications Review, February, 2000, paragraph 7. For years now hotel guests have been able to access a directory of guest services and related information by means of a television in their hotel room connected to the hotel's local area network. It has also been reported that travel industry enterprises have even tried handing out wireless communication devices to cruise ship passengers, so that while passengers are anywhere on board during their voyage they can easily make calls for dinner reservations or to plan excursions. "Travel Industry Cuts The Cord—Wireless Technology Makes It Work Easier For Employees And Boosts Customer Service," Information Week, Oct. 2, 2000, paragraphs 1-6.

From the above it should be appreciated that there is substantial opportunity and need for additional innovation regarding communications applications, and particularly for those related to services for travelers using wireless communication devices.

SUMMARY OF THE INVENTION

The present invention addresses these needs by way of a method, apparatus and computer program product for accessing information about local services and destinations for a facility, such as a hotel. Each one of the described destinations and services has a conventional telephone, i.e., connected to a conventional telephone network, also referred to as a wide area network, so that the telephone is accessible by a conventional wireless carrier network. (The term "wireless carrier network" as used herein includes a cellular phone system, such as a system according to the GSM standard in the 900 MHz band, which is now pervasive in developed countries, and permits calling among both wired and cellular phones. It also includes a phone system of similar functionality, but of the satellite type, such as Globalstar. (Globalstar is a trademark of Loral QUALCOMM Satellite Services.)) The means by which the telephones are coupled to the wide area network may include a local area network, such as a network limited to the facility premises. That is, the telephones may be more directly coupled to the local area network, which in turn is coupled to the wide area network. Accordingly, each of the telephones for the described services and destinations may be associated with a shortcut number, by which such a telephone may be accessed on the facility local area network for calls that originate within the facility local area network.

According to one form of the invention, a facility-mode program and a profile for a local facility are loaded in a memory associated with a portable device, such as a user's mobile telephone. The profile includes a description of services and destinations offered by the facility. For example, if the facility is a hotel, the profile includes listings for the hotel's front desk, concierge, room service, housekeeping, exercise facility, restaurant, etc. (It should be understood that the distinction between a service and a destination may not be significant. That is, the front desk in a hotel is a place where certain services are available, so it may in one sense be a service and in another sense a destination. Accordingly the term "service" may hereinafter be used to describe a service or a destination or both.) The profile also includes the conventional telephone number and the shortcut number for each listed service.

The program is operable to display on the user's portable device the services that are set out in the profile so that the user can select among them. When in the facility-mode of operation, the program is also operable to enable two sub-modes of operation for the portable device. For one of the sub-modes, a normal sub-mode, the program renders the device operable to place a call via the wireless carrier system in response to the user selection of one of the services displayed on the phone from the profile. In the normal sub-mode, the call is placed using the associated conventional telephone number listed in the profile for the selected service. For the other one of the sub-modes, a local sub-mode, the program renders the portable device operable to instead place the call for the selected service solely over the facility's local area network using the associated shortcut number listed in the profile.

In one aspect, the call over the local area network may be via a close-range, standard-protocol radio signal. (As the term "close-range, standard-protocol radio signal" is used herein it shall include a radio signal of limited power, i.e., for communication reliably no further than 100 feet, according to a protocol for which there is a publicly available, published specification, such as Bluetooth or IEEE 802.11 mentioned above. In related terminology, the term "close-range, standard-protocol network" is used herein to include a network formed by devices communicating at close-range, i.e., no more than 100 feet distant, using such a close-range, standard-protocol radio signal.)

In one alternative, the facility-mode program for the user's portable device may automatically set the device in the facility-mode, local sub-mode of operation in response to detection of a close-range, standard-protocol radio signal that indicates the local sub-mode of operation is available. In another alternative, the facility-mode program may receive a manual signal from the user indicating to set the device to the local sub-mode.

In one alternative, some or all of the services are not accessible via the wide area network, but rather are accessible only by the local area network. In this case, for any service not accessible via the wide area network the profile does not include a conventional, wide area network telephone. Further, if none of the services are accessible by the wide area network, the facility-mode program only has one mode of operation, i.e., a mode like that of the so-called sub-mode.

It is advantageous that in the manner described above the user can not only easily obtain and display a list of services for the facility by means of a memory-resident profile, but may also easily select one of the services and place a telephone call thereto. It may also be transparent to the user whether the routing of the call is by the wireless carrier network, which is largely external to the facility, or whether it is by the facility's local area network. Further, if the user is in close proximity to the facility the routing may be by the facility's local area network, thereby avoiding charges that might otherwise be incurred for use of the wireless carrier network and avoiding possible delays that might exist on the carrier network.

Other aspects, forms and advantages of the invention will become apparent upon reading the following detailed description and claims, and upon reference to the accompanying drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF A PREFERRED EMBODIMENT OF THE INVENTION

In the following detailed description of the preferred embodiments, reference is made to the accompanying drawings illustrating embodiments in which the invention may be practiced. It should be understood, however, that the drawings and detailed description are not intended to limit the invention to the particular form disclosed, but on the contrary, the intention is to cover all modifications, equivalents and alternatives falling within the spirit and scope of the present invention as defined by the appended claims.

Figure 1:
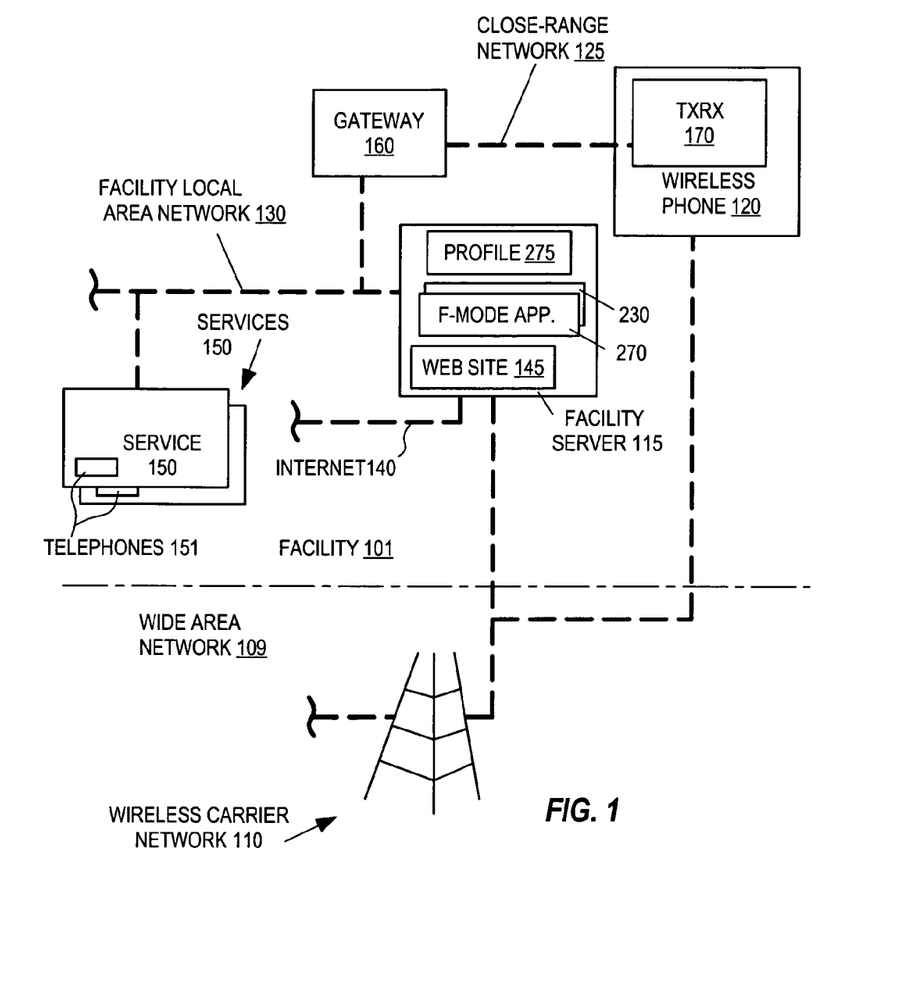
FIG. 1 illustrates a facility arranged for wireless access to a directory for services on a local area network of the facility, according to an embodiment of the present invention.

Referring now to FIG. 1, a facility 101 arranged for wireless access to a directory for services 150 on a local area network 130 of the facility 101 is illustrated, according to an embodiment of the present invention. Numerous services 150 of the facility 101 are shown, which have telephones 151 directly coupled to the local area network 130, which in turn is coupled to a wide area network 109 via a server 115, so that the telephones 151 are accessible by a carrier network 110 within the wide area network 109 by their respectively assigned, conventional telephone numbers. In the United States at the current time, for example, a conventional telephone number has seven digits and a three digit area code. Also, each of the telephones 151 have a shorter assigned telephone number (also referred to as a "shortcut number," an "internal extension" or "local number"), by which the telephone may be accessed on the local area network for calls that originate within the facility local area network. The number of digits for the shortcut number may depend on the number of telephones on the local network 130.

The local area network 130 is also coupled to a close-range, standard protocol gateway 160, which in the illustrated embodiment is a Bluetooth gateway, for establishing a close-range network 125 to communicate with proximate devices such as the illustrated wireless phone 120, which has a Bluetooth transceiver 170. As stated above, the local area network 130 is also coupled to a server 115. The server 115 has a web site 145, a profile 275, a server-based facility-mode application program 230 and a client-based facility-mode application program 270 stored thereon. The program 270 and profile 275 are for delivery to devices such as phone 120. The server 115 is also coupled to the carrier network 110 and to the Internet 140. Thus, the server 115 is capable of delivering the profile 275 and facility-mode application program 270 to devices such as phone 120 by any one of these connections, i.e., a connection to the local area network 130 via the close-range network 125 or some other connection (not shown), a connection to the Internet 140 or a connection to the carrier network 110.

Figure 2:
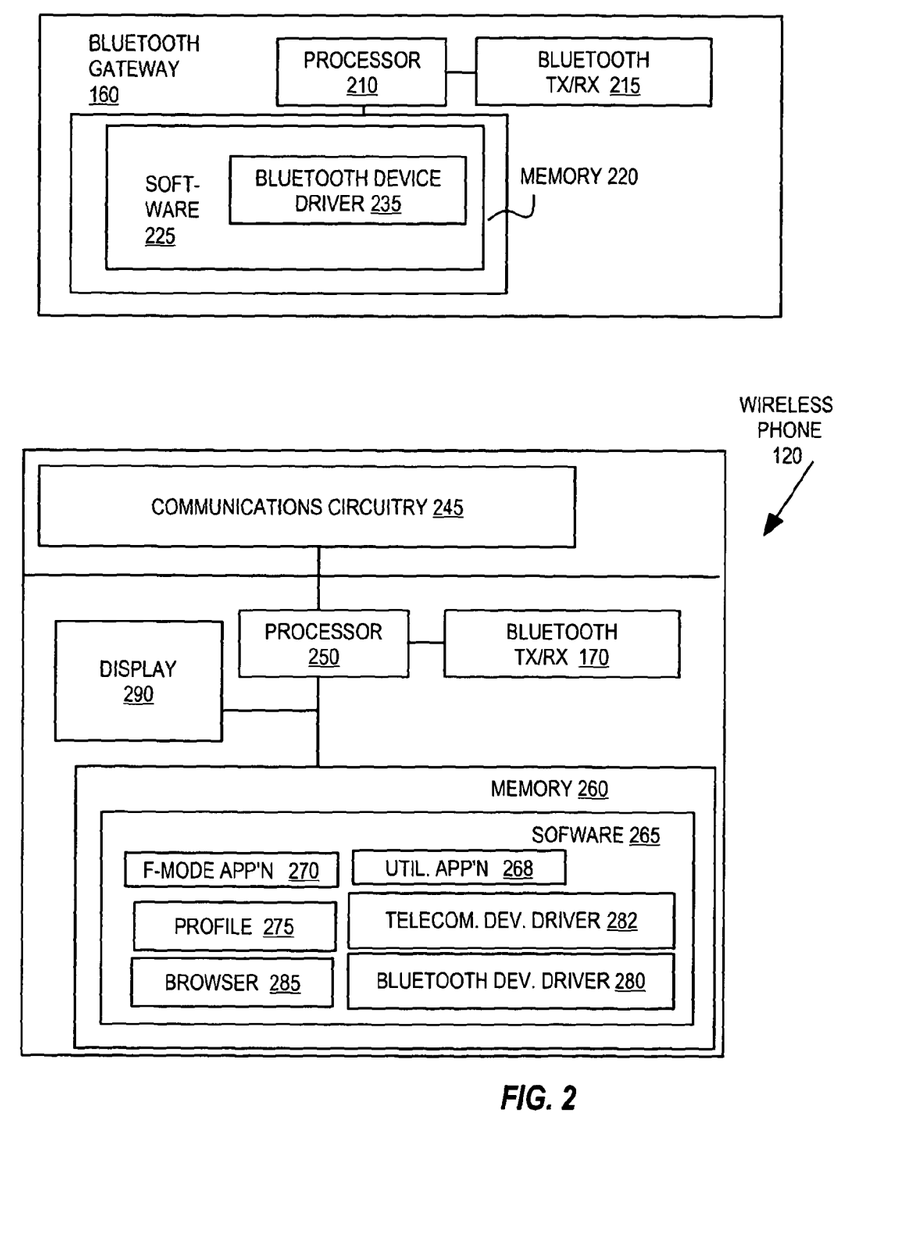
FIG. 2 illustrates a gateway for close-range network connection to the facility local area network, and illustrates a user's phone arranged for wireless access to the close-range network and to a carrier network, according to an embodiment of the present invention.

Referring now to FIG. 2, particular details of the gateway 160 for close-range network connection to the facility 101 (FIG. 1) local area network 130 (FIG. 1) are illustrated, as well as details of the user's phone 120, which is arranged for wireless access to the close-range network 125 (FIG. 1) and the wireless carrier network 110 (FIG. 1), according to an embodiment of the present invention. Certain details of the devices 120 and 160 that will be understood by a person of ordinary skill in the art are omitted in order to more clearly focus on selected features of the present invention.

Gateway 160 has a processor 210 coupled to memory 220, operable for storing software 225 for controlling the processor 210. Gateway 160 has a Bluetooth, i.e., close-range, standard-protocol, radio transceiver 215 operable to exchange Bluetooth—protocol radio communication with nearby devices such as wireless phone 120. The software 225 in the illustrated embodiment also includes a Bluetooth device driver 235.

Wireless phone 120, which is a portable device of a sufficiently small size for carrying by a person in a coat or trousers pocket, has a processor 250 coupled to memory 260, operable for storing software 265 for controlling the processor 250. The phone 120 also has telecommunications circuitry 245, display 290 and a Bluetooth, i.e., close-range, standard-protocol, radio transceiver 170. The software 265 in the illustrated embodiment includes a browser 285, a Bluetooth device driver 280, telecommunications circuitry driver 245 and a utility program 268 for managing downloads and settings, including assignments of hot keys. The phone 120 is shown in FIG. 2 having already loaded facility profile 275 and client facility-mode application 270 obtained from server 115 (FIG. 1), as will be described further herein below. Transceiver 170 is operable to exchange Bluetooth—protocol radio communication with gateway 160, including sending a telephone number to initiate a call on the facility local area network 130 (FIG. 1). Telecommunications circuitry 245 is operable to communicate on wireless carrier network 110 (FIG. 1), including sending a telephone number to initiate a call on network 110.

Figure 3:
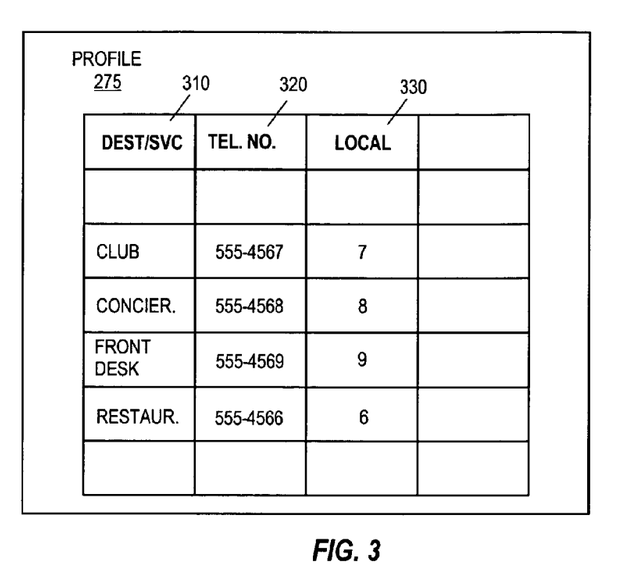
FIG. 3 illustrates structure of a profile, according to an embodiment of the present invention.

Referring now to FIG. 3, some additional aspects relating to the profile 275 are illustrated, according to an embodiment. As shown, the phone 120 memory 260 (FIG. 2) is operable for storing the facility profile 275, including descriptions 310 of hotel services 150 (FIG. 1). Examples of services for a hotel that may be in the profile 275 include the front desk, concierge, room service, housekeeping, exercise club room, restaurant, etc. The profile 275 includes conventional telephone numbers 320, i.e., telephone numbers accessible via the wireless carrier network 110, for the respective services in the descriptive list 310. The profile 275 also includes corresponding local telephone numbers 330, i.e., telephone numbers accessible via the hotel's local area network 130 for the respective services 150. The profile 275 is preferably an XML file.

Getting the Profile and Facility-mode Application Program.

With reference now to FIGS. 1-3, according to one embodiment of the invention for which the facility 101 includes a hotel, a user makes a hotel reservation by an Internet 140 connection using a browser 285 on his or her cell phone 120, or other such computerized device, such as a desktop computer, laptop computer, personal digital assistant, etc. As part of this process, the user ultimately selects a link on the hotel's web site 145 for indicating acceptance of a room offer. In response, the hotel server 115 checks the user's credit card, posts a charge to the credit account, reserves a room, generates a confirmation number, and sends the confirmation number, check-in and check-out dates, room type, etc., back to the user's browser 285. In addition, the hotel server 115 also requests permission from the user to download a profile 275 and facility-mode program 230 to the user's phone 120 or other device, such as described in connection with FIG. 3 herein, that includes descriptions of hotel services. Depending upon the settings of the user's device 120, permission may be automatically granted or else the download request may trigger a dialogue in which the user selects whether to permit or refuse the download request. If the user performs the reservation process using his or her desktop computer, for example, then once the profile 275 and program 270 have been downloaded to the computer the user may then manually initiate a transfer them to his or her cell phone 120.

Alternatively, the user may obtain a profile 275 and program 270 by selecting a link on a page on the hotel's web site 145 independently of the above hotel room reservation process. This could be done by the user from a browser 285 of the user's Internet enabled cell phone 120, or other device (as previously mentioned). Responsive to the user selection, the profile 275 and program 270 are downloaded from the hotel's server 115 to memory 260 in the user's device 120.

Selecting an Operating Mode.

Figure 4:
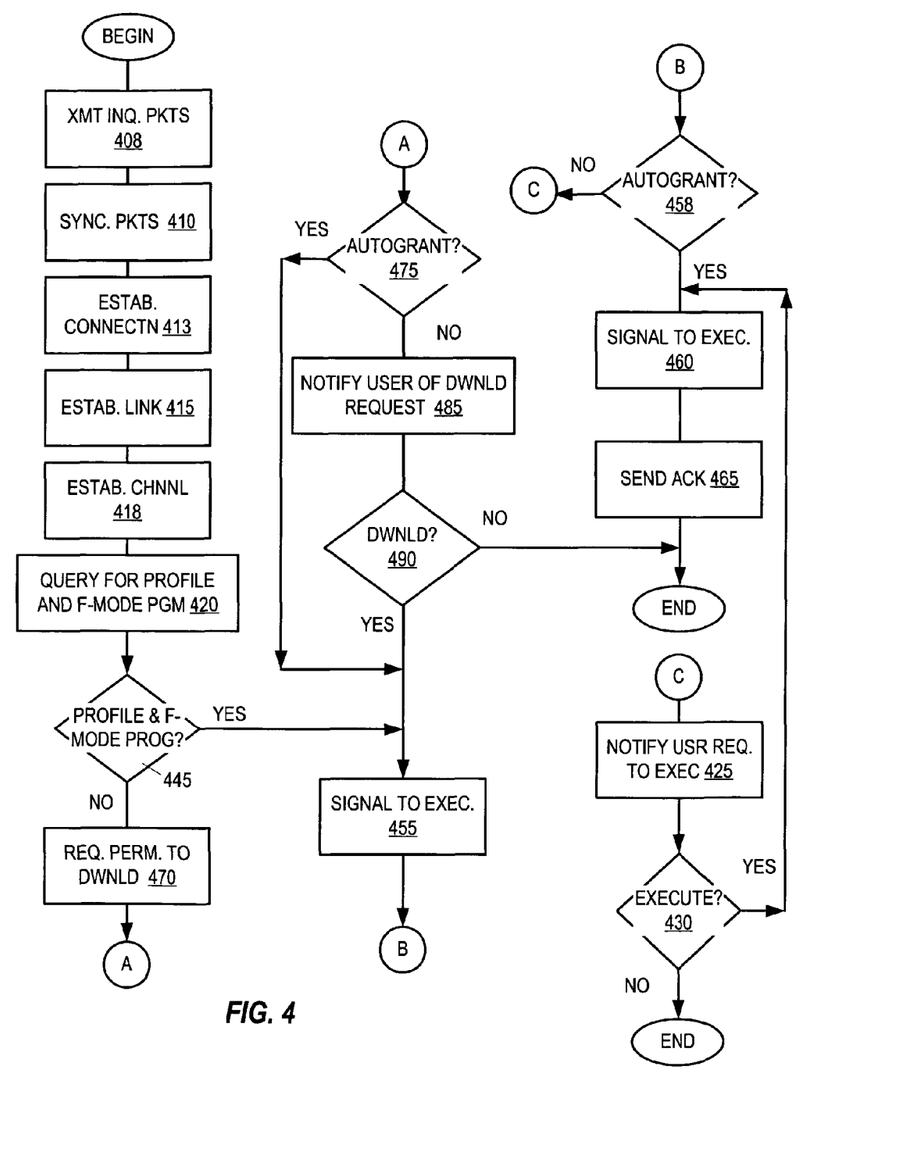
FIG. 4 illustrates operations for automatic switching of a users phone to a facility-mode of operation, according to an embodiment of the present invention.

Referring now to FIG. 4, flowchart 401 shows details for some additional aspects of Bluetooth-protocol communication between the gateway 160 and close-range transceiver 170, including service discovery aspects, beginning at 405, according to an embodiment of the invention. At 408 the gateway 160 transmits a series of inquiry packets, which effectively searches for nearby close-range transceivers 170. Then, at 410, a phone 120 that is within range responds with one or more frequency synchronization packets. At 413 a connection is established, and at 415 an asynchronous, connectionless baseband link is established via the gateway 160 between the phone 120 and the server 115. Then, at 418, a logical link control and adaptation protocol ("L2CAP") channel is established. Then, at 420, the server-based facility-mode program 230 uses the channel to query the program 268 on the phone 120 to determine whether the client-based facility-mode program 270 and profile 275 have already been loaded into memory 260 of phone 120. This includes sending version data, so that program 268 can determine if the phone 120 has the latest version of the program 270 and profile 275.

In response to the query at 420 program 268 checks at 445 for the existence of program 270 and profile 275 in memory 260. This includes checking their versions, if the program 270 or profile 275 exist. In connection with the checking at 445, the program 268 replies. If the reply is in the affirmative, then at 455 the server facility-mode program 230 signals for the client facility-mode program 270 to execute. At 458 program 268 checks settings to see if the phone 120 has been set by the user to permit automatic granting of program 270 execution. If yes, then at 460, program 268 starts execution of facility-mode application program 270 and processor 250 accordingly initiates the facility-mode of operation, so that as long as the phone 120 is within range of gateway 160, which may include a number of hubs (not shown), the phone 120 operates in the local sub-mode, communicating with the hotel services 150 telephones 151 via local area network 130, using the shortcut telephone numbers 330 (FIG. 3), instead of via wireless carrier network 110, using the conventional telephone numbers 320 (FIG. 3).

As long as phone 120 operates in facility-mode a directory of services is available for display (from the list 310 in profile 275 (FIG. 3)) and the user may select services from the displayed list 310 for automatically placing calls. Then, with the program 270 executing, the program 270 automatically receives an indication from transceiver 170 if the phone 120 goes outside of the range of gateway 160. If this happens then the program 270 automatically reverts to conventional sub-mode of operation if the user places a call by selection of a service from the list 310. That is, instead of sending the call via the local area network 130, using the shortcut telephone numbers 330 (FIG. 3), the program 270 sends the call via wireless carrier network 110, using the conventional telephone numbers 320 (FIG. 3).

At 465 the program 270 sends an acknowledgment to the server program 230, indicating the program 270 is executing as requested.

If program 268 indicates at 450 that the profile 275 and client facility-mode program 270 have not yet been loaded into memory 260 of phone 120, then at 470 the server program 230 requests permission for downloading the profile 275 and program 270. In response, program 268 checks settings at 475. Depending on the setting, permission is automatically granted at 480, or else at 485 program 268 notifies the user of the request, such as by an alert tone. Responsive to notification of the request, the user decides whether to grant permission or refuse the download and signals program 230 accordingly at 490. If the permission is granted, either automatically at 480 or manually at 490, program 230 initiates downloading at 495 and then the flow branches to 455, signaling that the program 270 and profile 275 now are resident in phone 120. If permission is not granted, flow chart 401 ends without downloading of the program 270 and profile 275.

If program 268 indicates at 445 that the latest profile 275 and client facility-mode program 270 have been loaded into memory 260 of phone 120, but the checking at 458 determines that the phone 120 has not been set by the user to permit automatic granting of program 270 execution, then flow branches to 425, where program 268 notifies the user of the request, such as by an alert tone. Responsive to notification of the request, the user decides whether to grant permission or refuse the switching to the facility-mode of operation and signals program 268 accordingly at 430. If permission is granted, then flow branches to 460, which is described herein above.

Alternatively, the user/guest may initiate communication from telephone 120 to the hotel gateway 160 and server-based program 230 via program 268 once the guest is within range, such as upon check in. The initial communication by the guest's device 120 may include permission for the download, or else the program 230 may request permission for the download in response to the guest's initial communication.

Figure 5:
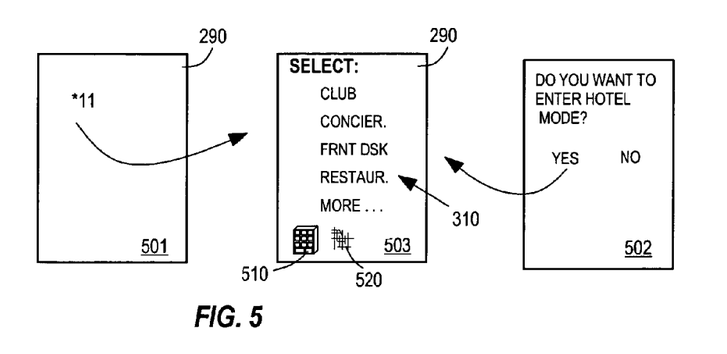
FIG. 5 illustrates two instances of local and conventional mode user interface information displayed on the user's phone, according to an embodiment of the present invention.

Referring now to FIG. 5, two instances 501 and 502 of user interface features are illustrated as displayed on 290 of user's phone 120 (FIG. 2) for initiating facility-mode operation, according to an embodiment of the present invention.

In the first instance 501, a utility program such as program 268 of the phone 120 has been used to associate facility-mode program 270 with a "hot" key sequence "*11." Accordingly, for the illustrated instance 501, the display 290 shows the user has entered "*11" on phone 120 (FIG. 2) keypad to start execution of the facility-mode program 270, which puts the phone 120 in the "facility" mode of operation. This generates the list 310 on display 290 as shown at instance 503 so the user can automatically call services 150 (FIG. 1) by selecting from the list 310, e.g., by tapping on the list 310 (if the display is touch sensitive), or by scrolling a cursor using keys of the phone 120, or the like.

In the second instance 502, the information shown on display 290 is the notification referred to in block 425 of FIG. 4, in which the program 268 is requesting the user if permission is granted to start the facility-mode program 270 due to automatic sensing of proximity of the close-range, standard-protocol network. If the user grants permission, as shown, by selecting "yes," the facility-mode program 270 executes, etc.

Although the program 270 automatically responds to loss of the close-range, standard-protocol network, as described herein above, note that in the third instance 503, i.e., with the phone 120 in facility-mode operation, two icons 510 and 520 are shown. These are for manually selecting between local operating sub-mode in which calls are place by the local area network 130 (FIG. 1) and the conventional sub-mode, in which calls are place by the carrier network 110 (FIG. 1). In the illustration, icon 510 appears as a hotel building, signifying that by selecting this button the phone 120 will go into local sub-mode. Icon 520 appears on the display 290 as a grid, such as a grid of streets, signifying that by selecting this button the phone 120 will go into the conventional sub-mode.

Alternatively, instead of the two icons 510 and 520 being displayed, only one of them may be displayed. For example, the hotel icon 510 may be used alone, wherein it is gray if not selected, indicating the phone 120 is in conventional sub-mode, and bold black when selected, indicating the phone 120 is in local sub-mode. In another alternative, a single icon may be displayed but its appearance may change as the icon is toggled between the two modes, so that in one mode the icon appears as the hotel 510, indicating the phone 120 is in local sub-mode, and in the other mode the icon appears as the grid 520, indicating the phone 120 is in conventional sub-mode.

Figure 6:
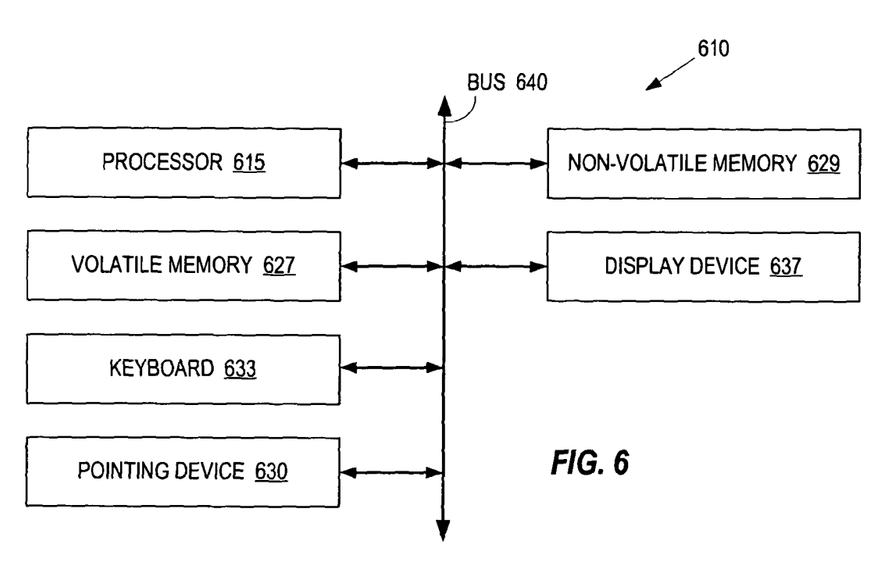
FIG. 6 illustrates a computer system suitable for certain aspects of an embodiment of the invention.

Referring to FIG. 6, a block diagram is shown illustrating a computer system 610 suitable for server 115 of FIG. 1, according to an embodiment of the present invention. In various embodiments, system 610 takes a variety of forms, including a personal computer system, mainframe computer system, workstation, server, etc. That is, it should be understood that the term "computer system" is intended to encompass any device having a processor that executes instructions from a memory medium. Likewise, although the term "server" is used herein above and server 115 is shown in FIG. 1, it should be understood that the computer system hosting the service provider's Web site may take a variety of forms in different embodiments of the invention and is not necessarily limited to a so-called "server."

System 610 includes a processor 615, a volatile memory 627, e.g., RAM, a keyboard 633, a pointing device 630, e.g., a mouse, a nonvolatile memory 629, e.g., ROM, hard disk, floppy disk, CD-ROM, and DVD, and a display device 637 having a display screen. Memory 627 and 629 are for storing program instructions (also known as a "software program"), which are executable by processor 615, to implement various embodiments of a method in accordance with the present invention. In various embodiments the one or more software programs are implemented in various ways, including procedure-based techniques, component-based techniques, and/or object-oriented techniques, among others. Specific examples include XML, C, C++ objects, Java and commercial class libraries. Components included in system 610 are interconnected by bus 640. A communications device (not shown) may also be connected to bus 640 to enable information exchange between system 610 and other devices. The gateway 160 of FIG. 1 may be included in the system 610.

The description of the present embodiment has been presented for purposes of illustration, but is not intended to be exhaustive or to limit the invention to the form disclosed. Many modifications and variations will be apparent to those of ordinary skill in the art. To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention. Those of ordinary skill in the art will appreciate that the hardware and methods illustrated herein may vary depending on the implementation. For example, it should be understood that while the Bluetooth wireless communications protocol has been described for the short-range radio communications protocol of the illustrated embodiment, it is within the spirit and scope of the invention to encompass an embodiment using another protocol, such as IEEE 802.11.

In another variation, for example, although the portable device of the illustrated embodiment has been described as a telephone 120 (FIG. 2), it should be understood that the term "telephone" is intended to encompass devices such as personal digital assistants. Other devices having more or less processors and memory devices and the like may be used in addition to or in place of the hardware depicted. The depicted example is not meant to necessarily imply architectural limitations with respect to the present invention.

Again referring to FIG. 1, in the description above there has been a focus on communication from a guest's wireless phone 120 to telephones at various service locations 150 in a facility 101, such as a hotel. In an enhancement to what has been described, upon establishing service for phone 120, server-based facility-mode program 230 may also establish a local number for the phone 120 so that calls from telephones 150 within the facility 101 may be routed to the phone 120 via LAN 130. That is, for example, the server-based facilities mode program may establish a number on the local area network for the user's wireless telephone, receive a call originating on the local area network for the user's telephone from a telephone in the facility and route the call originating on the local area network to the user's telephone solely via the local area network. With reference to FIG. 1, other variations concern server 115, local area network 130 and Internet service 140 for facility 101. A single computer system is depicted for server 115 of FIG. 1, which provides numerous functions, including i) coupling telephones 151 of facility 101 to, and routing calls to and from, the telephone carrier network 110 via LAN 130, ii) hosting a web site 145 for the facility 101, iii) storing the profile 275 and client-based facility mode program 270 for serving to clients upon request, iv) coupling the facility 101 to the Internet 140 and v) assigning numbers to user wireless telephones and routing calls to those telephones on the local area network. In various alternative embodiments, a number of computer systems, such as instances of computer system 610 (FIG. 6), may be dedicated to serving each respective one of these functions, or various combinations of the functions. Note also that there is a trend, as stated herein above, for integrating voice and data networks. (This is commonly referred to as "voice over Internet Protocol," or "VoIP.") Thus, although the arrangement of FIG. 1 depicts LAN 130 and Internet 140 as two networks, this may alternatively be a single network.

As described in the Summary herein above, in one alternative some or all of the services are not accessible via the wide area network, but rather are accessible only by the local area network. In this case, for any service not accessible via the wide area network the profile does not include a conventional, wide area network telephone number. Further, if none of the services are accessible by the wide area network, the facility-mode program only has one mode of operation, i.e., a mode like that of the "local" sub-mode.

It is important to note that while the present invention has been described in the context of a portable device having a processor and memory, those of ordinary skill in the art will appreciate that the processes of the present invention are capable of being distributed as computer readable medium of instructions in a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

Figure 7:
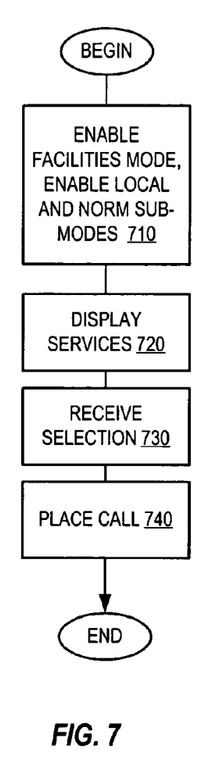
FIG. 7 illustrates aspects of a computer program in flow diagram form for a client-based facilities-mode program, in accordance with an embodiment of the invention.

Referring now to FIG. 7 in association with FIG. 1, aspects of a computer program are illustrated in flow diagram form for an embodiment of the client-based facilities-mode program 270, in accordance with what has been described herein above. As shown in block 710, the program 270 enables the user's wireless telephone 120 to operate in a facility-mode. The facilities mode may be invoked manually by the user or automatically in response to detecting proximity to gateway 160 or an associated hub (not shown) in local area network 130. Likewise, local or normal sub-modes may be invoked manually by the user or automatically in response to whether the gateway 160 is within range. In the facility mode, the user's telephone 120 displays the services from the profile 275, as shown in block 720. The program 270 then receives a selection of one of the services 150 from the display, as shown in block 730.

In response, the program 270 causes the user's telephone 120 to place a call to the selected service 150, as shown in block 740. If in the normal sub-mode, the call is placed via the wide area network 109 to a selected one of the services 150 using the associated longer telephone number 320 (FIG. 3) listed in the profile 275 for the selected service. If in the local sub-mode, the call is placed solely over the local area network 130 to a selected one of the services 150 using the associated shortcut number 330 (FIG. 3) listed in the profile 275 for the selected service 150.

Figure 8A:
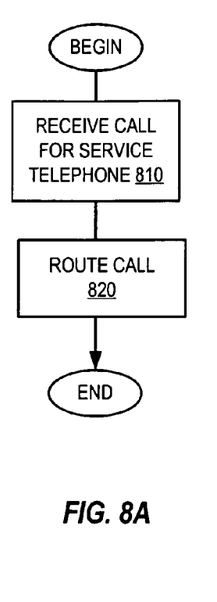
FIGS. 8A and 8B illustrate aspects of a computer program in flow diagram form for a server-based facilities-mode program, in accordance with embodiments of the invention.

Referring now to FIG. 8A in association with FIG. 1, aspects of a computer program are illustrated in flow diagram form for an embodiment of the server-based facilities-mode program 230, in accordance with what has been described herein above. As shown in block 810, the program 230 receives a call for one of the service telephones 151 from the user's wireless telephone 120. Then, in block 820, the program 230 routes the call over the local network 130 to one of the service's telephones 151 in response to receiving a telephone number for the service 150 from the user's wireless telephone 120, wherein the telephone number may be the service's shortcut number 330 (FIG. 3), which is received via a close-range, standard-protocol radio signal via the gateway 160, and, alternatively, the telephone number may be the service's longer number 320 (FIG. 2), which is received via the wide area network 109.

Figure 8B:
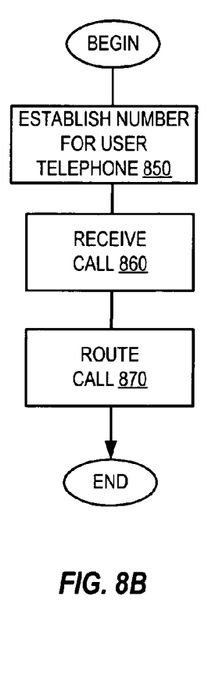

Referring now to FIG. 8B in association with FIG. 1, additional aspects of a computer program are illustrated in flow diagram form for an embodiment of the server-based facilities-mode program 230, in accordance with what has been described herein above. In block 850 the program 230 establishes a number on the local area network 130 for the user's wireless telephone 120. Then, in block 860, the program 230 receives a call originating on the local area network 130 for the user's telephone 120 from a telephone such as one of the service telephones 151 in the facility 101, or even from a telephone in a guest room (not shown). Next, the program 230 routes the call originating on the local area network 130 to the user's telephone 120 solely via the local area network 130.

To reiterate, many additional aspects, modifications and variations are also contemplated and are intended to be encompassed within the scope of the following claims. Moreover, it should be understood that in the following claims actions are not necessarily performed in the particular sequence in which they are set out.

What is claimed is:

1. A method for providing access to information about local services offered by a facility, the method comprising the steps of:

sending a client-based facility-mode program and a profile for the facility for loading in a memory associated with a user's portable device, wherein the profile includes a description of the local services offered by the facility, the services having respective telephones connected via a local area network of the facility to a wide area telephone network, wherein the telephones for the services have respective shortcut telephone numbers by which the telephones are accessible within the local area network and have longer telephone numbers by which the telephones are accessible within the wide area network and wherein the profile includes the longer telephone numbers and the shortcut numbers for the services, and wherein the facility-mode program enables the portable device to operate in a facility mode for displaying the descriptions of the services from the profile so that the user can select a service from among the displayed services, and to operate in local and normal sub-modes of the facility mode, wherein responsive to the user's service selection in the normal sub-mode of operation the user's portable device places a call to the selected service via the wide area network using the longer telephone number and in the local sub-mode of operation the user's portable device places the call to the selected service via the local area network using the shortcut number; and routing the call over the local network to the service telephone of the selected service in response to receiving a telephone number for the service from the user's portable device, wherein the telephone number includes the shortcut number received via a close-range, standard-protocol radio signal if the user's device places the call in the local sub-mode and the telephone number includes the longer number received via the wide area network if the user's device places the call in the normal sub-mode.

2. The method of claim 1, comprising the steps of:
transmitting inquiry packets to search for nearby portable devices having close-range, standard-protocol transceivers; and
querying a responding portable device to determine whether the client-based facility-mode program and profile have already been loaded into memory of the responding portable device.

3. The method of claim 1, comprising the steps of:
establishing a telephone number on the local area network for the user's portable device;
receiving a call for the user's portable device, wherein the call originates on the local area network from a telephone in the facility;
routing the call originating on the local area network to the user's portable device solely via the local area network.

4. The method of claim 1, wherein the description of the local services includes descriptions of services offered by the facility, ones of the services including physical destinations at the facility for accessing the respective services and other ones of the services including service functions provided by service providers of the facility.

5. A computer program product, stored on a tangible, computer-readable medium, for providing access to information about local services offered by a facility, said computer program product having instructions for execution by a computer, wherein the instructions, when executed by the computer, cause the computer to implement a method, the computer program product comprising:

a profile for the facility for loading in a memory associated with a user's portable device, wherein the profile includes a description of the local services, the services having respective telephones connected via a local area network of the facility to a wide area telephone network, wherein the telephones for the services have respective shortcut telephone numbers by which the telephones are accessible within the local area network and have longer telephone numbers by which the telephones are accessible within the wide area network and wherein the profile includes the longer telephone numbers and the shortcut numbers for the services;

client-based facility-mode program instructions for operating the portable device in a facility mode, wherein in the facility mode the portable device displays the descriptions of the services from the profile so that the user can select a service from among the displayed services, and to operate in local and normal sub-modes of the facility mode, wherein responsive to the user's service selection in the normal sub-mode of operation the user's portable device places a call via the wide area network using the longer telephone number and in the local sub-mode of operation the user's portable device places the call via the local area network using the shortcut number; and instructions for routing the call over the local network to the selected one of the service telephones in response to receiving a telephone number for the service from the user's portable device, wherein the telephone number includes the shortcut number received via a close-range, standard-protocol radio signal if the user's device places the call in the local sub-mode and the telephone number includes the longer number received via the wide area network if the user's device places the call in the normal sub-mode.

6. The computer program product of claim 5, stored on a tangible, computer-readable medium, comprising:
instructions for transmitting inquiry packets to search for nearby wireless portable devices having close-range, standard-protocol transceivers; and
instructions for querying a responding portable device to' determine whether the client-based facility-mode program and profile have already been loaded into memory of the responding portable device.

7. The computer program product of claim 5, stored on a tangible, computer-readable medium, comprising:
instructions for establishing a telephone number on the local area network for the user's portable device;
instructions for receiving a call for the user's portable device, wherein the call originates on the local area network from a telephone in the facility;
instructions for routing the call originating on the local area network to the user's portable device solely via the local area network.

8. The computer program product of claim 5, stored on a tangible, computer-readable medium, wherein the description of the local services includes descriptions of services offered by the facility, ones of the services including physical destinations at the facility for accessing the respective services and other ones of the services including service functions provided by service providers of the facility.

9. A computer system for providing access to information about local services offered by a facility, the system comprising:
at least one processor; and
a storage device connected to the at least one processor, wherein the storage device has stored thereon:
a profile for the facility for loading in a memory associated with a user's portable device, wherein the profile includes a description of the local services, the services having respective telephones connected via a local area network of the facility to a wide area telephone network, wherein the telephones for the services have respective shortcut telephone numbers by which the telephones are accessible within the local area network and have longer telephone numbers by which the telephones are accessible within the wide area network and wherein the profile includes the longer telephone numbers and the shortcut numbers for the services;

client-based facility-mode program instructions for operating the portable device in a facility mode, wherein in the facility mode the portable device displays the descriptions of the services from the profile so that the user can select a service from among the displayed services, and to operate in local and normal sub-modes of the facility mode, wherein responsive to the user's service selection in the normal sub-mode of operation the user's portable device places a call via the wide area network using the longer telephone number and in the local sub-mode of operation the user's portable device places the call via the local area network using the shortcut number; and a program for controlling the at least one processor, wherein the at least one processor is operative to execute instructions of the program to implement a method comprising the steps of:

sending the profile and the client-based facility-mode program instructions to the user's portable device; and routing the call over the local network to the selected one of the service telephones in response to receiving a telephone number for the service from the user's portable device, wherein the telephone number includes the shortcut number received via a close-range, standard-protocol radio signal if the user's device places the call in the local sub-mode and the telephone number includes the longer number received via the wide area network if the user's device places the call in the normal sub-mode.

10. The computer system of claim 9, wherein the method implemented by the at least one processor executing the instructions of the program comprises:

transmitting inquiry packets to search for nearby portable devices having close-range, standard-protocol transceivers; and querying a responding portable device to determine whether the client-based facility-mode program and profile have already been loaded into memory of the responding portable device.

11. The computer system of claim 9, wherein the method implemented by the at least one processor executing the instructions of the program comprises:

establishing a telephone number on the local area network for the user's portable device;

receiving a call for the user's portable device, wherein the call originates on the local area network from a telephone in the facility;

routing the call originating on the local area network to the user's portable device solely via the local area network.

12. The computer system of claim 9, wherein the description of the local services includes descriptions of services offered by the facility, ones of the services including physical destinations at the facility for accessing the respective services and other ones of the services including service functions provided by service providers of the facility.

* * * * *